United States Patent [19]
Senior et al.

[11] Patent Number: 5,910,240
[45] Date of Patent: Jun. 8, 1999

[54] FCC UNIT CATALYST STRIPPER

[75] Inventors: Richard C. Senior, Cherry Hill; Christopher G. Smalley, Wrightstown, both of N.J.; Timothy P. Holtan, Joliet, Ill.

[73] Assignee: Mobil Oil Corporation, Fairfax, Va.

[21] Appl. No.: 09/144,877

[22] Filed: Sep. 1, 1998

Related U.S. Application Data

[62] Division of application No. 08/771,869, Dec. 23, 1996.

[51] Int. Cl.⁶ .................................................. C10G 35/00
[52] U.S. Cl. ........................ 208/113; 208/146; 208/150; 208/151; 208/163; 208/164
[58] Field of Search .................................. 208/113, 150, 208/151, 146, 163, 164

[56] References Cited

U.S. PATENT DOCUMENTS 2,069,192  1/1937  Behr .
3,717,938  2/1973  Sylvest ...................................... 34/168

*Primary Examiner*—Walter D. Griffin
*Assistant Examiner*—Tam Nguyen
*Attorney, Agent, or Firm*—Malcolm D. Keen

[57] ABSTRACT

An improved stripper section design is provided for use in fluid catalytic cracking (FCC) units. The stripper section contains means for imparting rotational movement to the FCC cracking catalyst as it traverses the stripping section. In one embodiment the stripper section contains at least one rotation vane that is preferably disposed on the surface of a stripper section tray. The rotation vane provides angular, rotational movement to the cracking catalyst as it traverses the stripper section. Vertical movement is imparted to the cracking catalyst due to gravity and radial movement is imparted to the catalyst due to the slanted nature of the tray. Through the use of the rotation vanes the contact between the catalyst particles and the stripping steam is increased, thereby improving the overall efficiency of the FCC operation.

6 Claims, 11 Drawing Sheets

FCC UNIT CATALYST STRIPPER

This application is a divisional of Ser. No. 08/771869 filed on Dec. 23, 1996.

The field of the invention is fluidized catalytic cracking (FCC) in general and catalyst stripping in particular.

Catalytic cracking is the backbone of many refineries. It converts heavy feeds into lighter products by catalytically cracking large molecules into smaller molecules. Catalytic cracking operates at low pressures, without significant hydrogen addition, in contrast to hydrocracking, which operates at high hydrogen partial pressures. Catalytic cracking is inherently safe as it operates with low oil: catalyst ratios in the reactor during the cracking process.

There are two main variants in catalytic cracking: moving bed and the far more popular and efficient fluid bed process.

In fluidized catalytic cracking (FCC), the catalyst, having a particle size between about 20–100 microns circulates between a cracking reactor and a catalyst regenerator. In the reactor, hydrocarbon feed contacts hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating it. The cracked products are separated from the coked catalyst. The coked catalyst is stripped of volatiles, usually with steam, in a catalyst stripper and the stripped catalyst is then regenerated within the regenerator. A catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere. Catalytic cracking is an endothermic reaction process. The heat for cracking is supplied at first by the hot regenerated catalyst from the regenerator. In actuality, it is the feed which supplies the heat needed to crack the feed. Some of the feed deposits as coke on the catalyst, and the burning of this coke generates heat in the regenerator, recycled to the reactor in the form of hot catalyst.

Catalytic cracking has undergone much development since its introduction over fifty years ago. The trend of development of the FCC process has been to all riser cracking and the design of zeolite catalysts.

Riser cracking gives higher yields of valuable products than dense bed cracking. Most FCC units now use all riser cracking, with hydrocarbon residence times in the riser of less than 10 seconds, and even less than 5 seconds.

Zeolite based catalysts of high activity and selectivity are now used in most FCC units. These catalysts allowed refiners to increase throughput and conversion, as compared to operation with amorphous catalyst. The zeolite catalyst effectively debottlenecked the reactor section, especially when a riser reactor was used.

Another development occurred which debottlenecked the FCC regenerator —CO combustion promoters. To regenerate FCC catalysts to low residual carbon levels refiners used to add limited amounts of air. Coke was burned to CO and $CO_2$, but air addition was limited to prevent afterburning and damaging temperature excursions in the regenerator. U.S. Pat. Nos. 4,072,600 and 4,093,535, taught adding Pt, Pd, Ir, Rh, Os, Ru and Re in concentrations of 0.01 to 50 ppm, to allow CO combustion to occur within the dense bed of catalyst in the regenerator. CO emissions were eliminated, and regenerators were now limited more by air blower capacity than anything else.

To summarize, zeolite catalysts increased the capacity of the cracking reactor. CO combustion promoters increased the capacity of the regenerator to burn coke. FCC units now had more capacity, which could be used to process poorer feeds or achieve higher conversions. Constraints on the process, especially for units already in operation, could now shift to some other place in the unit, such as the wet gas compressor, main column, etc.

One way refiners took advantage of their new reactor and regenerator capacity was to process feeds that were heavier, and had more metals and sulfur. These heavier, dirtier feeds pushed the regenerator, and exacerbated existing problems in the regenerator—steam production and temperatures. These problems show up in the regenerator and are reviewed in more detail below.

Steam deactivates the FCC catalyst. Steam is not intentionally added to the regenerator, but is invariably present, usually as adsorbed or entrained steam from steam stripping of catalyst or as water of combustion formed in the regenerator.

Poor stripping leads to a double dose of steam in the regenerator, first from the adsorbed or entrained steam and second from "fast coke" or hydrocarbons left on the catalyst due to poor catalyst stripping. These hydrogen-containing unstripped hydrocarbons burn in the regenerator to form water and steam the catalyst, deactivating it. U.S. Pat. No. 4,336,160 to Dean et al, reduces catalyst steaming by staged regeneration. This requires major capital expenditures.

Steaming became even more of a problem as the temperature within the regenerators rose as higher temperatures accelerate steam deactivation.

Today, regenerators operate at higher temperatures. Most FCC units are heat balanced, the endothermic heat of cracking is supplied by burning the coke deposited on the catalyst. With poorer feeds, more coke deposits on the catalyst than is needed for the cracking reaction. The regenerator operates at higher temperatures, in excess heat being emitted in the form of high temperature flue gas. Regenerator temperature now limits many refiners in the amount of resid or high CCR feeds which can be tolerated by the unit. High temperatures are a problem for the metallurgy of many units, but more importantly, are a problem for the catalyst. In the regenerator, the burning of coke and unstripped hydrocarbons leads to higher surface temperatures on the catalyst than the measured dense bed or dilute phase temperature. This is discussed by Occelli et al in Dual-Function Cracking Catalyst Mixtures, Ch. 12, fluid catalytic Cracking, ACS Symposium Series 375, American Chemical Society, Washington, D.C., 1988.

High temperatures make vanadium more mobile and promote formation of acidic species which attack zeolite structure, leading to loss of activity. Some efforts at controlling regenerator temperature will now be reviewed.

Some regenerator temperature control is possible by adjusting the $CO/CO_2$ ratio in the regenerator. Burning coke partially to CO produces less heat than complete combustion to $CO_2$. However, in some cases, this control is insufficient, and also leads to increased CO emissions, which can be a problem unless a CO boiler is present.

The prior art used dense or dilute phase regenerator heat removal zones or heat-exchangers remote from, and external to, the regenerator to cool hot regenerated catalyst for return to the regenerator. Such approaches help, but are expensive, and some units do not have space to add a catalyst cooler.

Although these problems showed up in the regenerator, they were not a fault of poor regeneration, but rather an indication that a new pinch point had developed in the FCC process.

The reactor and regenerator enjoyed dramatic increases in capacity due to changes in the catalyst. The old hardware could process more feed.

Thanks to zeolite cracking catalyst, the reactor side cracked more efficiently. Some refiners even reduced reactor volume to have all riser cracking. Thanks to Pt, the regenerator could now run hotter without fear of afterburning. Many existing regenerators were, if anything, oversized and more readily deactivated the zeolite catalyst.

Improvements in stripping technology did not match those occurring in the reactor and regenerator. Increased catalyst and oil traffic was easily and profitably handled by the reactor and the regenerator, but not by the stripper. Poor catalyst stripping was now the source of much of the problems experienced in the FCC regenerator.

The solution to this problem should not be to remove all of the excess heat from the regenerator. Only as a last resort should refiners take excess heat from the regenerator with coolers, or go to multistage regeneration so that some catalyst regeneration occurs in a drier atmosphere.

The key had to be in reducing waste. It was better to reduce the amount of unstripped hydrocarbons burned in the regenerator, rather than deal with unwanted heat release in the regenerator. There was a special need to: remove more hydrogen from spent catalyst to minimize hydrothermal degradation in the regenerator; remove more sulfur-containing compounds from spent catalyst before regeneration to minimize SOx in flue gas; and reduce to some extent the regenerator temperature.

Although much work has been done on stripping designs, reliability has been considered more important than efficiency. Most strippers contain relatively large, slanted plates to aid stripping. Thus, in many FCC strippers chevron plates, shed trays or inclined trays at 30–60 degree angles are used to improve catalyst/stripping steam contact. Steep angles and large openings are needed both because FCC catalyst has poor horizontal flow characteristics and because large pieces of concrete and/or dome coke can and do fall into the stripper.

Refiners chose to avoid horizontal surfaces, such as those used in a bubble-cap tray. Flat surfaces develop stagnant regions where catalyst can "set up" like concrete. Under flat surfaces bubbles of hot cracked vapors can undergo thermal reactions.

Therefore, refiners position the trays at steep angles in the strippers. Catalyst flows smoothly through the stripper, but gas contacting is often poor. In a typical annular design (an annular stripper disposed about a riser reactor) the goal is to have up flowing gas contact down flowing catalyst circumferentially distributed around a central riser reactor.

In these typical annular FCC designs, wherein slant trays are attached to the riser reactor outer wall and the stripper inner wall in an alternating fashion, the FCC catalyst has primarily two-dimensional flow—vertical flow due to gravity and horizontal flow due to the slant of the tray. Inefficient stripping results in such designs due to various factors such as the withdrawal of the catalyst from a stripper outlet located at only one circumferential point along the perimeter of the stripper. It is a common occurrence that the catalyst flow directly above this outlet section is too fast (thus the contact between the stripping steam and the catalyst is inefficient) and that the catalyst flow on the opposite side of the stripper from the outlet is too slow (thus resulting in catalyst buildup and inefficient stripping).

Many current stripping designs are so poor that an increase in stripping steam may not improve stripping. In some units, added stripping steam causes dilute phase transport of spent catalyst into the regenerator. Refiners with overloaded FCC catalyst strippers thus have a serious problem. The various possible solutions are not attractive.

The obvious solution, putting in a much larger stripper can not be done at a reasonable cost. The stripper is closely integrated with the rest of the FCC, usually as part of the reactor vessel, and modifications are expensive. The reactor vessel is or becomes out of round, and enlarging the stripper, so that it merges with a larger ID portion of the reactor vessel requires extensive fit-up work.

It is also possible to increase the catalyst capacity of existing slanted plate strippers by making each tray shorter. This could be visualized as converting a disc and doughnut stripper to one with alternating layers of speed bumps on inner and outer surfaces of the stripper annulus. This provides more area for catalyst flow, but promotes bypassing (steam up and catalyst down) through the stripper.

A unique way has now been found to get better stripping of coked FCC catalyst by modifying the current stripper design to retain much or all of the existing tray area.

SUMMARY OF THE INVENTION

The present invention provides improved designs for the stripper section of an FCC unit. The improved stripper section of the present invention contains a plurality of vanes used to impart rotational movement to the FCC catalyst stream as it traverses through the stripper section vertically by way of gravity and horizontally (radially) by way of the slanted surfaces of the stripper trays.

In one embodiment of the present invention there is provided an improved stripper tray design for use in the stripping section of a fluid catalytic cracking unit wherein spent FCC catalyst particles are contacted with a stripping fluid to remove hydrocarbons from the catalyst particles. The improved tray design adds a third dimension to the flow of the catalyst through the stripper section by providing rotational flow means on the surface of the slant trays to impart a rotational flow, i.e., angular motion, to the catalyst as it traverses the stripper section. The vertical flow of the catalyst through the stripper section is due to gravity and the horizontal, or radial, flow of the catalyst is due to the slanted nature of the tray. In the present invention, the third flow direction, in a rotational pattern within the annulus of the stripper, is imparted by the rotational flow means. The present invention also provides for methods of operating a fluid catalytic cracking unit utilizing the improved stripper tray design.

In one embodiment of the present invention, the improved trays comprise an upper tray portion for receiving the spent fluid catalytic catalyst and a downstream tray portion, located at a point vertically below the upper portion, the downstream portion terminating in a tray edge for discharging catalyst to a vertically lower tray. The tray has a slanted tray surface, encompassing both the upper and downstream tray portions, where the tray surface angle is from about 10°–80° to impart radial movement to the catalyst as the catalyst flows downward over the tray in a vertical fashion. The tray further contains means for imparting rotational flow to the catalyst as the catalyst traverses the slanted tray surface, the rotational flow means being disposed on the tray surface. In one embodiment, the rotational flow means are rotation vanes that have a front surface beginning at a rear edge located in the upper portion of the tray and terminating at a front edge located in the downstream portion of the tray, wherein the front surface of the rotation vane is angled across the tray surface such that the front edge of the rotation vane is at different radial point in the radial direction of catalyst flow that is angularly displaced in the direction of the rotational flow of the catalyst from the rear edge.

The trays of the present invention can further comprise a plurality of steam distribution holes extending through the tray, the distribution holes being located in the downstream portion of the tray. The steam distribution holes can extend through the tray at an angle substantially perpendicular to the tray surface. It is preferred to angle the steam distribution holes at an angle in the direction of the rotational flow imparted to the catalyst from the rotational flow means.

The present invention also provides for fluid catalytic cracking units having a stripper section design that contains slanted trays with the rotational flow means. The present invention also provides for the operation of the fluid catalytic cracking unit with the inventive stripper tray design. That is, the present invention provides for a fluid catalytic cracking process for converting a hydrocarbon feedstock that comprises (1) contacting the feedstock with a cracking catalyst that is capable of promoting the conversion of the feedstock in a reactor section to produce at least one hydrocarbon product with a concomitant production of coke on the cracking catalyst, (2) separating at least a portion of the hydrocarbon product from the cracking catalyst in a disengager section, (3) stripping the cracking catalyst with a fluid, such as steam, in a stripper section, and (4) regenerating the cracking catalyst in a regeneration section to oxidize at least a portion of the coke, wherein steps (1) through (4) are repeated continuously, and where the cracking catalyst is passed over a plurality of vertically spaced trays located within the stripper section, at least a portion of the trays being rotation trays as described above and further herein. The FCC process is distinguished from such refinery processes as hydrocracking, hydrodesulfurization, hydrotreating, etc. in that those processes are operated at high absolute pressures with high partial pressures of hydrogen.

In other embodiments of the present invention, the means for imparting rotational flow to the catalyst stream as it traverses through the stripper section can be positioned within the stripper section such that the means are not disposed on the surface of the stripper trays. In one embodiment, vanes are provided within the stripper section, preferably attached to the stripper walls, where the vanes function to impart rotational movement to the catalyst.

DETAILED DESCRIPTION OF THE INVENTION

The present invention provides improved designs for the stripper section of an FCC unit. The improved stripper section of the present invention contains a plurality of vanes used to impart rotational movement to the FCC catalyst stream as it traverses through the stripper section vertically by way of gravity and horizontally (radially) by way of the slanted surfaces of the stripper trays.

In one embodiment of the present invention there is provided an improved slant tray design for use in a stripper section of a fluid catalytic cracking (FCC) unit. In another embodiment there is provided an improved stripper section design that is independent of the slant trays. These designs of the present invention increase the efficiency of the contact between the FCC catalyst particles and the stripping fluid, typically steam, in the stripper section by means of passing the FCC catalyst particles over a vane that imparts rotational movement to the catalyst.

The present invention also provides for the operation of an FCC unit incorporating the improved stripper section and slant tray designs.

In operation, an FCC unit thermally and catalytically cracks a hydrocarbon feedstock into lower boiling point products. This is accomplished by contacting the feedstock with an FCC catalyst, typically a zeolite-containing catalyst (crystalline aluminosilicate), within the riser section of the FCC unit. The FCC catalyst becomes partially deactivated during the contacting step due to the build-up of coke and the catalyst must therefore be regenerated. This is accomplished by first separating the FCC catalyst and the riser reactor products in a disengager section. The separated FCC catalyst particles are directed into a stripper section to remove certain hydrocarbons still associated with the FCC catalyst by contacting the FCC catalyst with a stripping fluid, typically steam, which will be used throughout the further discussion of the present invention as representing all stripping fluids. The stripped FCC catalyst is then directed into a regenerator within which the coke deposits are partially removed and the catalyst is thus regenerated. The catalyst is then returned to the riser reactor to resume the FCC process.

Figure 1:
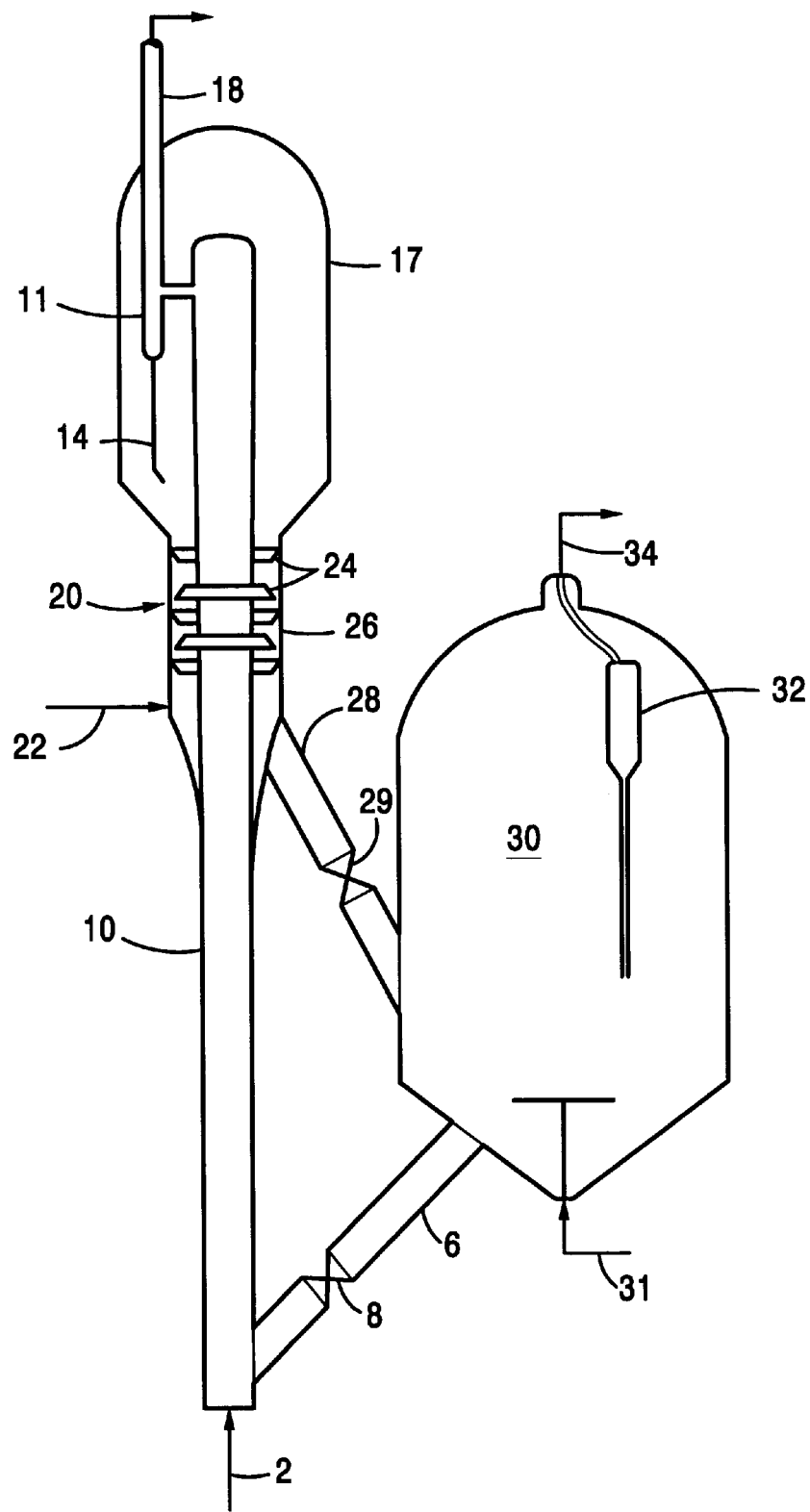
FIG. 1 depicts a conventional annular fluid catalytic cracking unit employing a conventional stripper tray design of the prior art.

As an illustration of the general operation of an FCC unit, reference can be made to FIG. 1, which shows a simplified schematic of a typical annular FCC unit. A hydrocarbon feedstock such as gas oil or higher boiling material is introduced through line 2 to the bottom of a riser reactor 10. Hot, regenerated catalyst, typically in the range of about 600–800° C., is also introduced to the bottom section of the riser reactor 10 by way of a standpipe 6 usually equipped with a flow control valve 8. The FCC catalyst is typically introduced at a higher mass flowrate than that of the hydrocarbon feedstock to ensure proper cracking yields. A fluid suspension is formed in the lower section of the riser reactor 10, generally at a temperature of about 525–650° C. depending on, inter alia, the degree of hydrocarbon conversion desired and the composition of the feedstock. The fluid suspension flows upwardly through the riser reactor 10. Residence of the hydrocarbon feedstock in the riser reactor is generally between about 0.1 to about 15 seconds. Within the riser reactor 10 the FCC catalyst intimately contacts the hydrocarbon feedstock and catalytically cracks that feedstock into useful lower boiling point products. The FCC catalyst becomes partially deactivated during this contacting step primarily due to coke being deposited onto the surface of the FCC catalyst. The fluid suspension passes into a suitable separation means, such as a series of cyclones 11, which serve to rapidly separate the hydrocarbon products from the FCC catalyst particles. Thus, in the apparatus shown in FIG. 1, the fluid suspension is discharged from the riser reactor 10 into one or more inertial separators (such as cyclones), attached to the discharge of the riser reactor 10, and represented by separator means 11. The product gases are withdrawn from the disengager section 17 via line 18 for further processing. The FCC catalyst is then directed through a dipleg 14 and discharged into a bed of FCC catalyst in the stripper section 20 of the FCC unit.

The function of the stripper section 20 is to remove a portion of the hydrocarbon material that is still associated with the FCC catalyst particles prior to their entry into the regenerator. This is typically accomplished by contacting the FCC catalyst particles with a suitable stripping gas, such as steam. As shown in FIG. 1, the steam is introduced into the stripper section 20 via line 22. Within the stripper section 20 there is established a countercurrent flow between the FCC catalyst particles, which are flowing downward and the steam, which is flowing upward. Trays 24 are commonly used within the stripper section 20 to improve the contacting between the FCC catalyst particles and the steam. The trays 24 are typically slanted at an angle to the horizon to promote the flow of the FCC catalyst particles in a downward direction. The trays 24 are commonly alternately attached to the riser reactor 10 and to the wall 26 of the stripper section 20 in such a manner that the FCC catalyst particles flow in a "back and forth" fashion as they flow downward through the stripper section 20. The walls 10 of the riser reactor form the inner walls of the stripper section at this area of the FCC unit. The trays 24 thus disrupt the flow of the FCC catalyst through the stripper section 20 to increase the efficiency of the steam stripping operation.

The stripped FCC catalyst, which still contains the deactivating coke deposits, is then directed via line 28, and through flow control valve 29, into the regenerator 30. A regeneration gas, typically air, is introduced into the regenerator 30 via line 31. The regenerator gas may comprise air or optionally preheated air or oxygen supplemented air at temperatures ranging from about 100–260° C. and about 170–450 kPa(gauge). This regeneration gas is introduced in an amount sufficient for fluidizing the FCC catalyst. The coke deposits on the FCC catalyst are oxidized within the regenerator 30 forming a regenerated FCC catalyst and a regenerator flue gas. The regenerated FCC catalyst is separated from the regenerator gas by means of regenerator cyclones 32, which direct the regenerator gas out of the regenerator 30 via line 34. The regenerated FCC catalyst, which is now heated, is directed via line 6 back to the bottom of the riser reactor 10 to continue the FCC unit cycle.

Thus, the general concepts of the FCC unit and its operation have been discussed with reference to FIG. 1. However, the details of such a process, being known to those of skill in the art, are not set forth herein. The present invention is applicable to annular FCC units, such as the one depicted in FIG. 1, and their general operation, as well as non-annular FCC units. Particulars as to various processing parameters, such as feed rates, temperatures, pressures, etc. for the operation of these FCC units is not a critical aspect of the present invention, unless otherwise noted.

Figure 2:
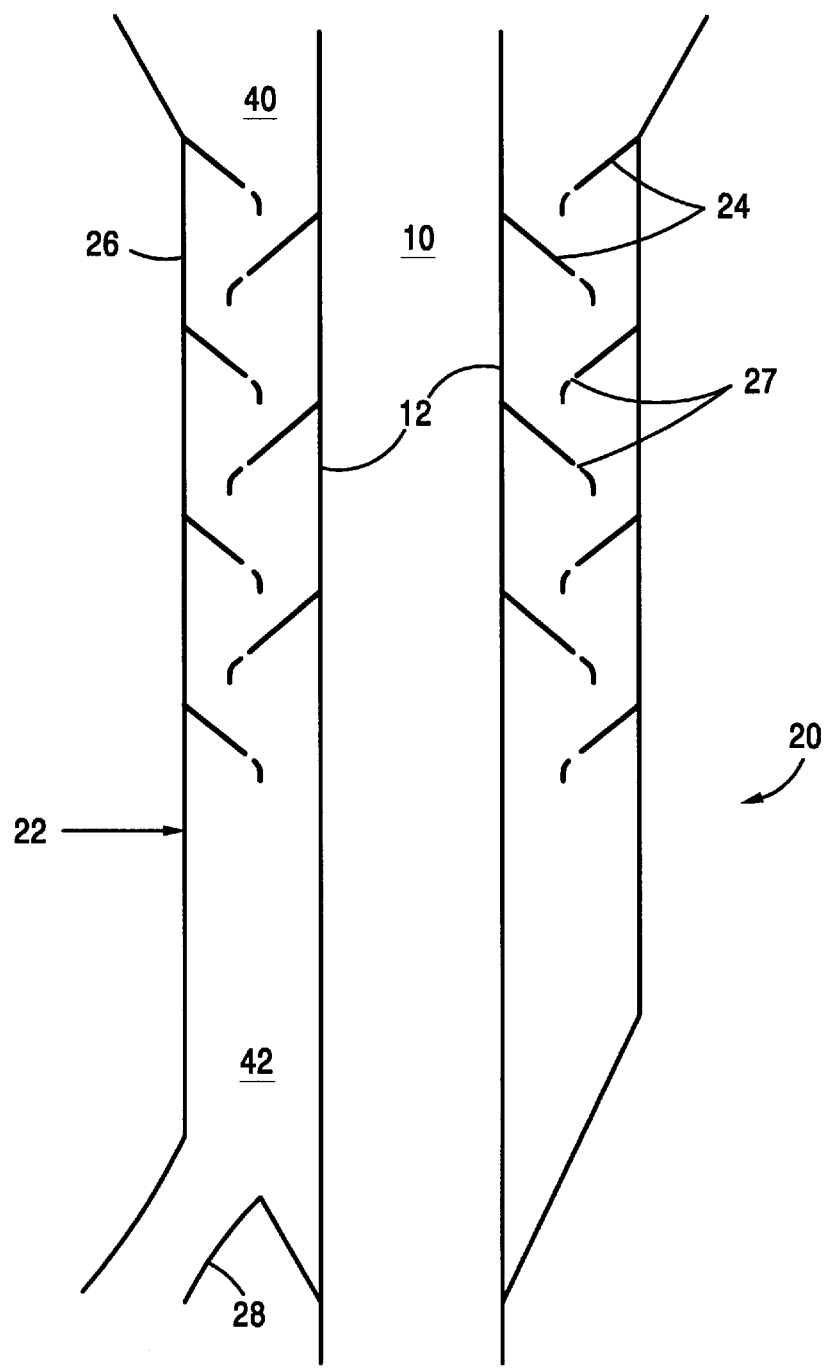
FIG. 2 is a more detailed view of a conventional annular fluid catalytic cracking unit employing a conventional stripper tray design of the prior art.

FIG. 2 represents a detailed view of the stripper section employing a conventional tray 24 design. In this design, the trays 24 are alternately attached to the sidewall 12 of the riser reactor 10 and to the sidewall 26 of the stripper 20. The riser reactor 10 passes through the annulus of the stripper 20 in such an FCC unit design, and the reactor sidewall 12 forms the inner wall of the stripper section. The spent or deactivated FCC catalyst particles enter the stripper 20 at its upper section 40 and exit via line 28 in the lower section 42. The steam enters the stripper, commonly in the lower section 42, via line 22, and commonly through a steam sparger (not shown). The steam travels upward through the stripper 20 and counter currently contacts the downward flowing FCC catalyst. The steam, and associated hydrocarbon compounds stripped from the FCC catalyst, exit the stripper 20 at the upper section 40 and travel into the disengager section.

The trays 24 are slanted with respect to the vertical direction, and the angle upward from a vertical reference line, such as the reactor wall 12 or stripper wall 26, can range from about 10–80°, more commonly from about 15–75°, and even more commonly from about 35–65°. In such a way, the slanted trays 24 act to keep the FCC catalyst particles flowing downward through the stripper 20 and also act to increase the contact between the FCC catalyst and the rising steam. To further improve the contact with the rising steam, steam distribution holes 27 are sometimes drilled or cut through the trays 24 perpendicular to the tray surface 25. The rising steam collects beneath the slanted trays 24, thus building a head of pressure, which forces the steam up through the holes 27, ultimately increasing the contact between the steam and the FCC catalyst particles.

The FCC catalyst particles thus traverse downwardly through the stripper 20 in the vertical direction by means of gravity. The FCC catalyst particles also traverse through the stripper 20 in a radial direction by means of the slanted trays 24. That is, the FCC catalyst particles, as they flow downwardly through the stripper 20, also flow "back and forth" (radially inward and outward) from an upper tray to an immediate lower tray. This radial direction is also referred to as the horizontal direction herein.

The tray design shown in the stripper 20 in FIG. 2 is subject to channeling of the FCC catalyst particles. As stated previously, the FCC catalyst particles are contacted with steam in the stripper section to remove hydrocarbon compounds from the catalyst. The catalyst particles are fluidized by the steam. A suspension (sometimes referred to as an emulsion) of the catalyst particles in the steam/hydrocarbon fluids is thereby created within the stripper section. Channeling can occur because as the catalyst particles flow down through the stripper, the gas pressure increases and the gas in the dense catalyst suspension is compressed. Unless additional gas, e.g. steam, is added, the catalyst suspension will begin to defluidize, that is, the particles will start to rub against each other and the catalyst particles will not flow freely. Steam bubbles cannot easily penetrate through defluidized catalyst, and the result is channeling of the FCC catalyst particles and poor distribution of the catalyst flow.

Figure 3:
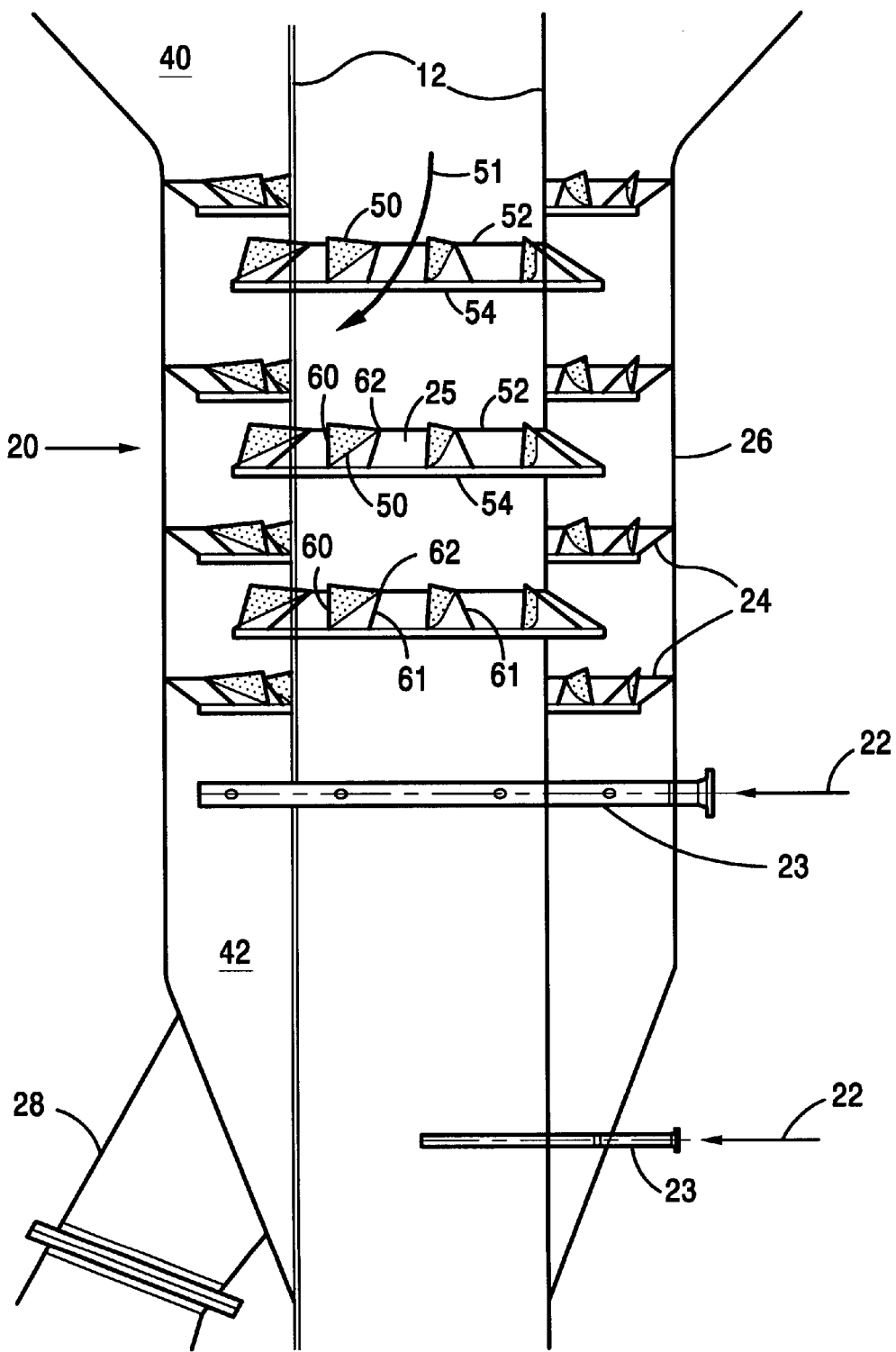
FIG. 3 is a partially cut-away view of a stripper section of an annular fluid catalytic cracking unit employing one embodiment of the rotational tray design of the present invention.

One design to enhance the efficiency of the stripper section, and one embodiment of the present invention, is the improved rotation tray 24 design shown in FIG. 3. In FIG. 3, the trays 24 are shown as slanted trays alternatively affixed to the wall 26 of the stripper 20 and the riser reactor wall 12 (inside stripper 20 wall). The inner trays 24 affixed to the riser reactor wall 12 are frustro-conical shape surfaced trays, and the outer trays 24 affixed to the wall 26 of the stripper have surfaces that are also frustro-conical although in a different orientation. The trays 24 have a plurality of rotation vanes 50 disposed on the surface 25 of the trays 24. The rotation vanes 50 act as a means for imparting a rotational motion to the FCC catalyst stream that flows downward through the stripper 20 from its upper section 40 to its lower section 42. The rotational flow of the catalyst is depicted for illustrative purposes as line 51. The degree of rotational flow imparted to the FCC catalyst can vary depending on the FCC design, although it is preferred to orient the rotation vanes 50 in such a way as to impart enough rotational movement to rotate the flow of the FCC catalyst at least about ¼ of the way around the annulus of the stripper 20. The rotational movement is imparted to the catalyst stream or "suspension" as a whole; that is, it is not the intent of the present invention to impart rotational (spinning) motion to the individual particles such that they individually spin around their central axis.

The rotation vanes 50 of the present invention can be constructed of a material similar to that used to construct the tray 24. Common construction materials include steel and steel alloys, high alloy steels such as chromium steel alloys, and steel alloys with a refractory surface. The height of the slanted trays 24 varies with different FCC unit designs and the trays are generally from about 8 inches to about 3 feet in height. The number of trays in any given FCC unit will also vary and typically a stripper section will contain from about 3 to about 8 trays. The distance between the trays can also vary depending on the operation parameters of the FCC unit.

The rotation vanes 50, as shown in FIG. 3, preferably extend from a point proximate to the top 52 of the tray 24 down to a point proximate to the bottom edge 54 of the tray 24. Thus, the rear edge 62 of the vane 50 is shown as being coincident with the top 52 of the tray 24, although for proper functioning the rear edge 62 is preferably at least at a point proximate to the top 52 of the tray 24, and should for more efficient functioning be located in the upper portion of the tray surface 25. However, the rear edge 62 can be located in the lower section of the tray 24 with the retainment of the benefits of the present invention to the improved flow of the FCC catalyst through the stripper. Similarly, the front edge 60 of the vane 50 is shown as being coincident with the bottom 54 of the tray 24, although for proper functioning the front edge 60 is preferably at least at a point proximate to the bottom 54 of the tray, and should for efficient functioning be located in the lower portion of the tray surface 25. As shown in FIG. 3, the rotation vanes 50 can be designed to have an increasing height from the top 52 of the tray to the bottom 54, although the vanes 50 can be constructed to have a uniform or decreasing height along their length. The rotation vanes 50 shown in FIG. 3 are disposed on the surface 25 of the trays 24. The stripper section of the FCC unit can contain a plurality of the rotation trays of the present invention, and preferably at least 50% of the trays will be "rotation trays", that is, trays containing at least one vane 50.

As shown in FIG. 3, steam, or other suitable stripping fluids, can be introduced into the lower section 42 of the stripper via lines 22 through spargers 23.

Figure 4:
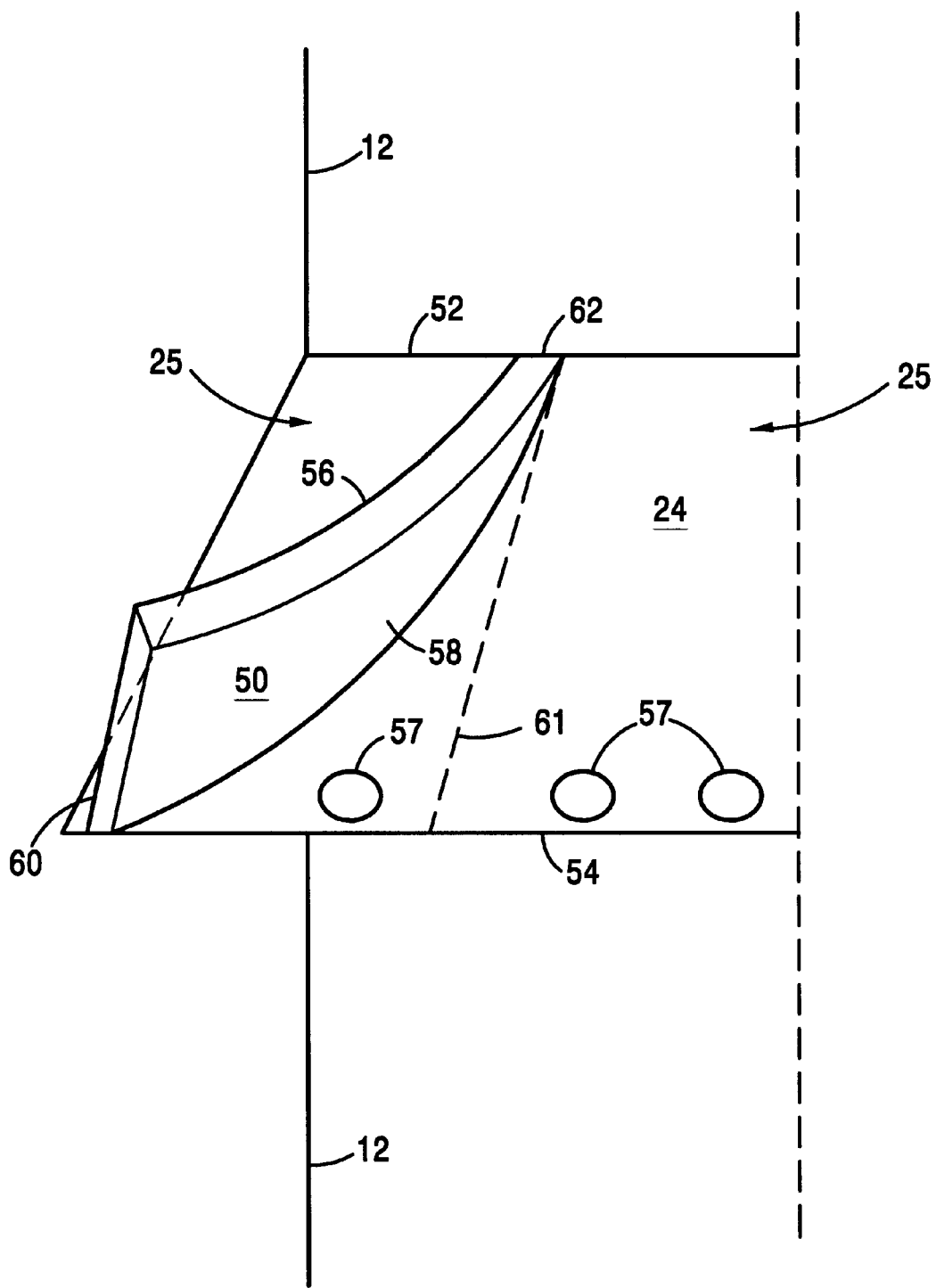
FIG. 4 is a more detailed view of a rotational vane disposed on the surface of a slanted tray used in the stripper section.

One design for the rotation vane 50 is shown in FIG. 4. In this figure, the tray 24 is attached to the wall 12 of the riser reactor (inside stripper wall). The vane 50 is disposed on the surface 25 of the tray 24 and extends from the top 52 to the bottom 54 of the tray 24. The function of the vane 50 is to impart a rotational motion to the FCC catalyst as it descends vertically through the stripper section. The slanted surface 25 of the tray 24 imparts radial movement to the FCC catalyst. In this design for the vane 50, the rotational movement is imparted by having the front edge 60 of the vane 50 at a different radial point, in the direction of the radial flow of the catalyst, that is angularly displaced in the direction of the induced rotational FCC catalyst flow, from the rear edge 62 of the vane 50. This is shown by the reference line 61, which is a radial line drawn from the center of the riser reactor and which is perpendicular to the rear edge 62 of the vane 50. In this embodiment, the front surface 56 of the vane 50 is a concave surface to aid in imparting rotational movement to the FCC catalyst flow. The back surface 58 of the vane 50 can be of any geometry and the vane 50 itself can take on various geometries. The vane 50 can be disposed on the surface 25 of the tray 24 by any conventional means such as welding or fastening by means of bolts, rivets, etc., and can even be made as an integral part of the tray 24 during the manufacturing of the tray.

The rotational vanes 50 can be spaced apart along the surface of the trays 24 at various distance intervals, which need not be constant on any particular tray or series of trays. Indeed, various designs are possible, with the height and overall distance from the front edge 60 to rear edge 62 of the vanes 50 being variable over a plurality of potential designs.

Also shown in FIG. 4 are stripper gas holes 57, which are used to improve the contact between the stripper gas (steam) and the FCC catalyst particles. The steam collects underneath the slanted tray 24 and thus builds a head of pressure that forces the steam through the holes 57. The steam travels through the tray 24 within the hole 57 and contacts the FCC catalyst particles that are cascading over the edge of the tray. The steam that traverses through the holes 57 aids in the flow of the catalyst particles from the tray surface 25. In prior uses, the holes 57 are cut at a perpendicular to the surface 25 of the tray 24.

Figure 5:
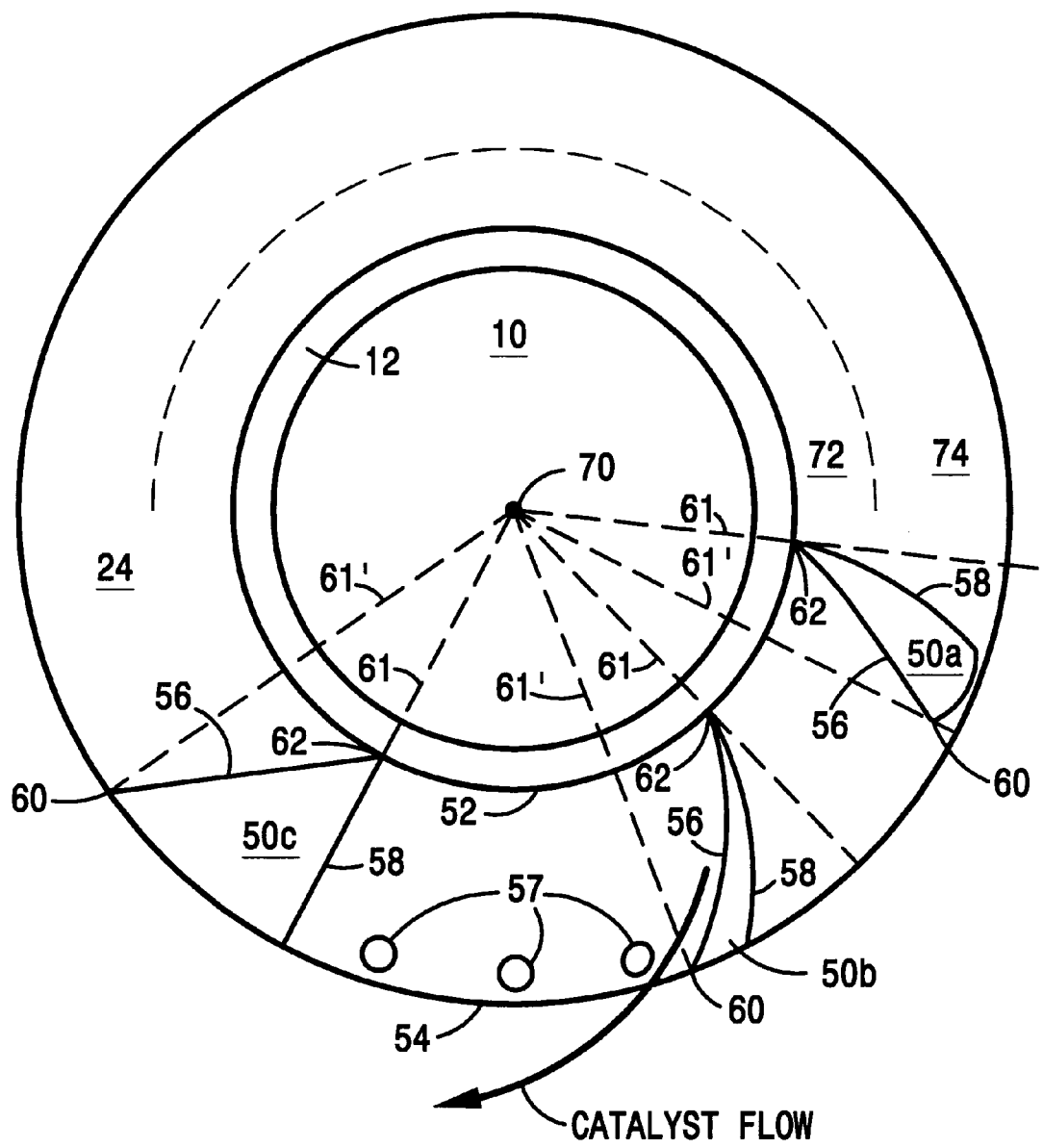
FIG. 5 is a top-view of an interior rotational tray of the present invention employing various rotational vane designs.

As can be understood, the design of the rotational vane 50 can be of various geometries to achieve the desired result of imparting rotational flow to the FCC catalyst that is moving vertically through the stripper due to gravity and radially through the stripper due to the slanted surface of the trays. Examples of vane geometries are shown in FIG. 5 wherein a top view of a portion of the stripper section is shown. This view again shows a tray 24 that is attached to the wall 12 of the riser reactor 10. The vanes 50 are shown as having various geometries. Vane 50a is shown as having a generally concave front surface 56, however that surface does not extend fully to the bottom 54 of the tray 24, but does extend from the upper portion 72 into the lower portion 74 of the tray surface 25. The upper portion 72 of the tray is defined as the upper half of the surface 25 of the tray 24. The front edge 60 of the vane 50a is defined as the point furthermost angularly distant from the rear edge 62 and thus the point where the FCC catalyst would disengage from the vane 50.

Radial lines 61 and 61' illustrate this point, with radial line 61 extending from the center 70 of the riser reactor 10 and drawn so as to be perpendicular to the rear edge 62 of the vane 50. The radial line 61' is similarly drawn to be perpendicular to the front edge 60 of the vane 50. Vane 50b is shown as be coextensive with the surface 25 of the tray 24 and also having a concave front surface 56 and back surface 58. The vane 50c has yet another geometry where the front surface 56 is straight and the rear surface 58 is also straight and in line with radial line 61.

Figure 6:
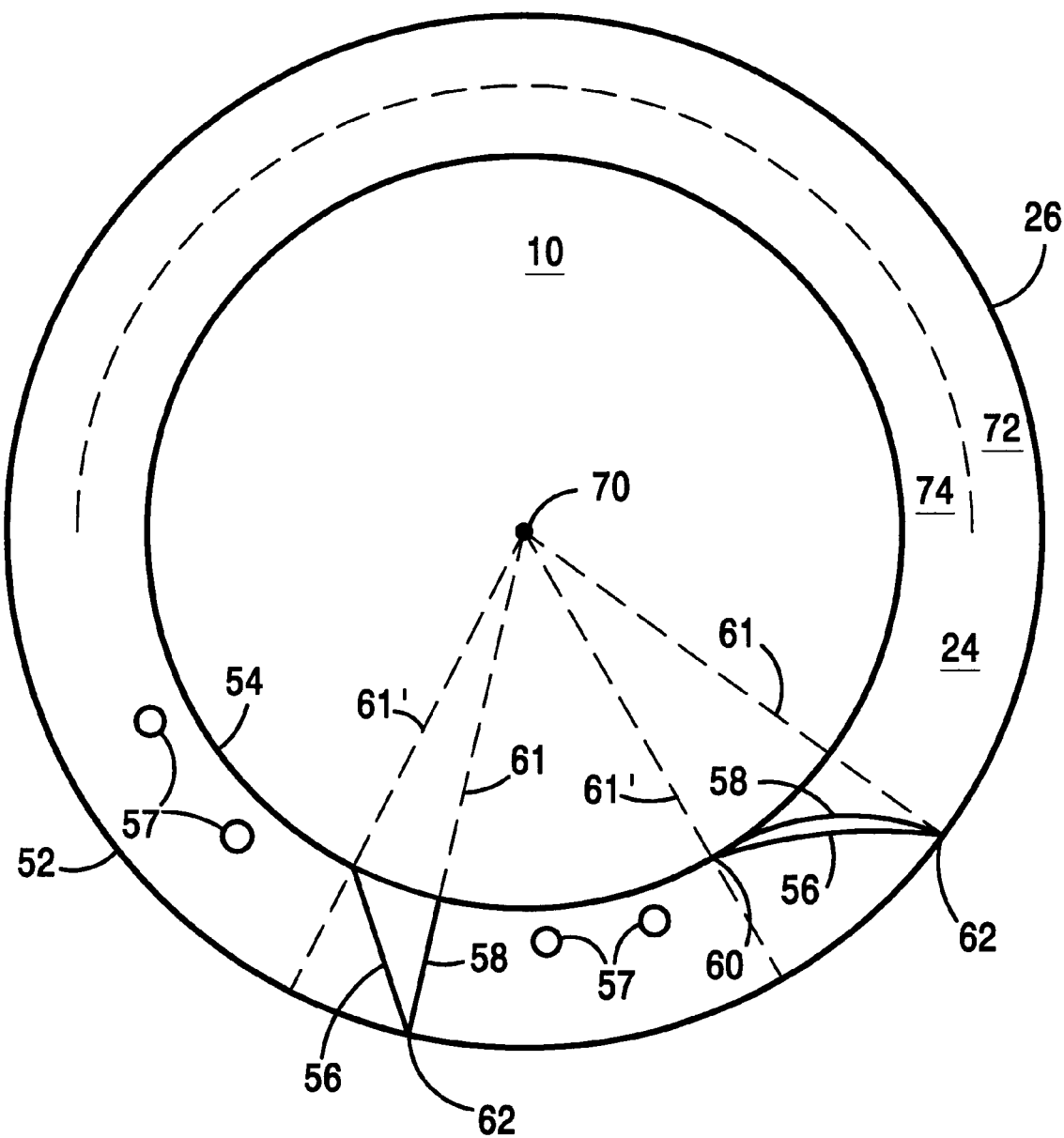
FIG. 6 is a top-view of an exterior rotational tray of the present invention employing various rotational vane designs.

The same rotational vane 50 geometry can be used to construct the vanes that are disposed on the surface of the trays 24 attached to the outside wall 26 of the stripper. As shown in FIG. 6, the rear edge 62 of the vanes 50 is proximate to the top 52 of the tray 24 in the upper portion 72 of the tray and the front edge 60 is proximate to the bottom 54 of the tray 24 in the lower portion 74 of the tray 24. The front 56 and back 58 surfaces of the vanes 50 can be of various geometries. The front edge 60 of the vane 50 is at a point that is radially (horizontally) different in the direction of the radial flow of the FCC catalyst, and that is angularly displaced in the direction of the induced rotational flow of the FCC catalyst, from the rear edge 62 of the vane 50.

Figure 7:
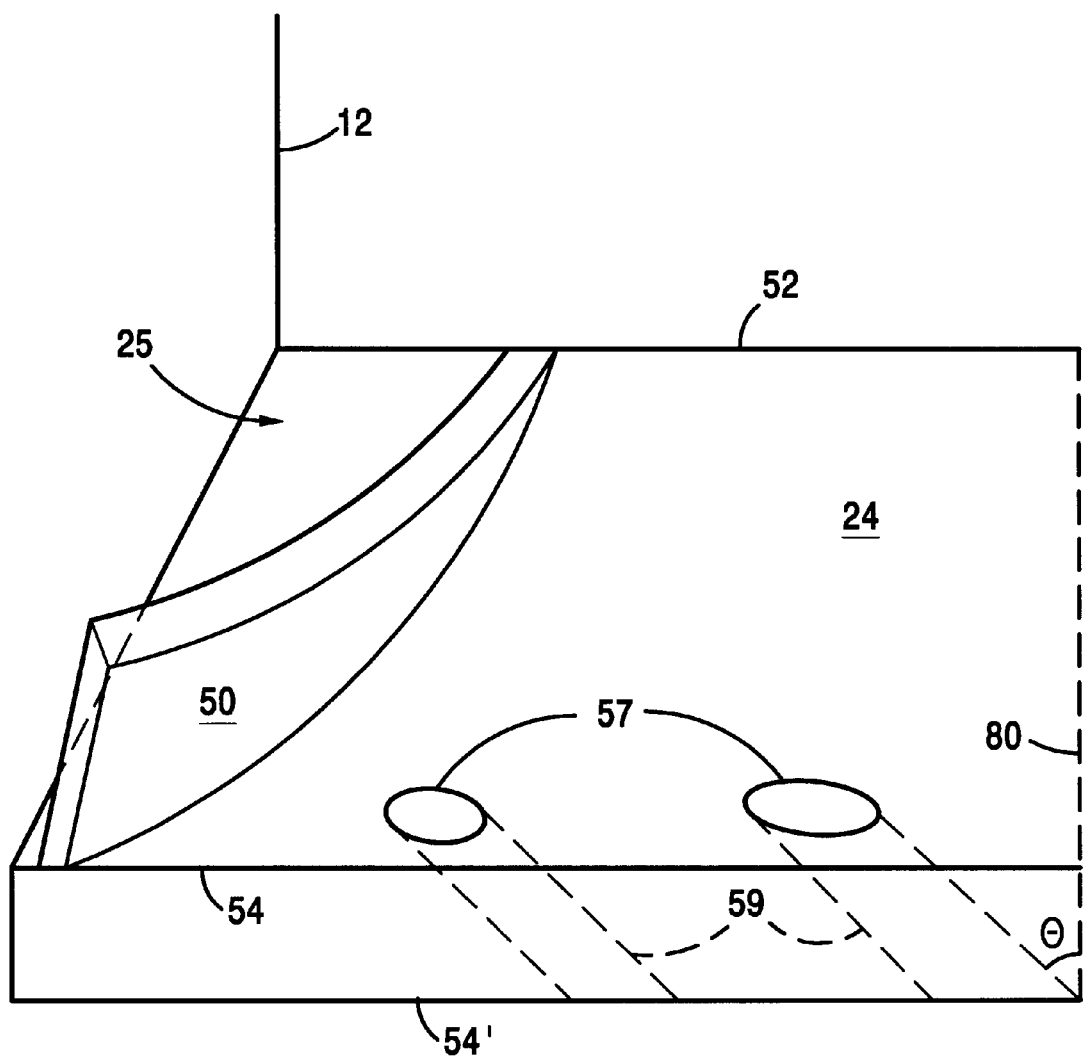
FIG. 7 details the angled nature of the steam distribution holes disposed within the rotational vane trays of the present invention.

A further embodiment of the present invention relates to a redesigning of the stripper gas holes 57. To improve the rotational movement imparted to the FCC catalyst, these holes 57, or at least a portion thereof, can be cut through the tray 24 at an angle. As shown in FIG. 7, the sidewalls 59 of the holes 57 are cut at angles, θ, to the perpendicular (line 80), in the direction of the rotational flow being imparted to the FCC catalyst by the rotation vane 50. The holes 57 extend from the bottom side 54' of the tray 24 to the upper bottom surface 54. The number of angled holes 57 to be used on any particular tray can vary, and a tray need only have a portion, although preferably all, of the holes cut at the angle. The angle need not be constant for each stripper gas hole 57.

Figure 8:
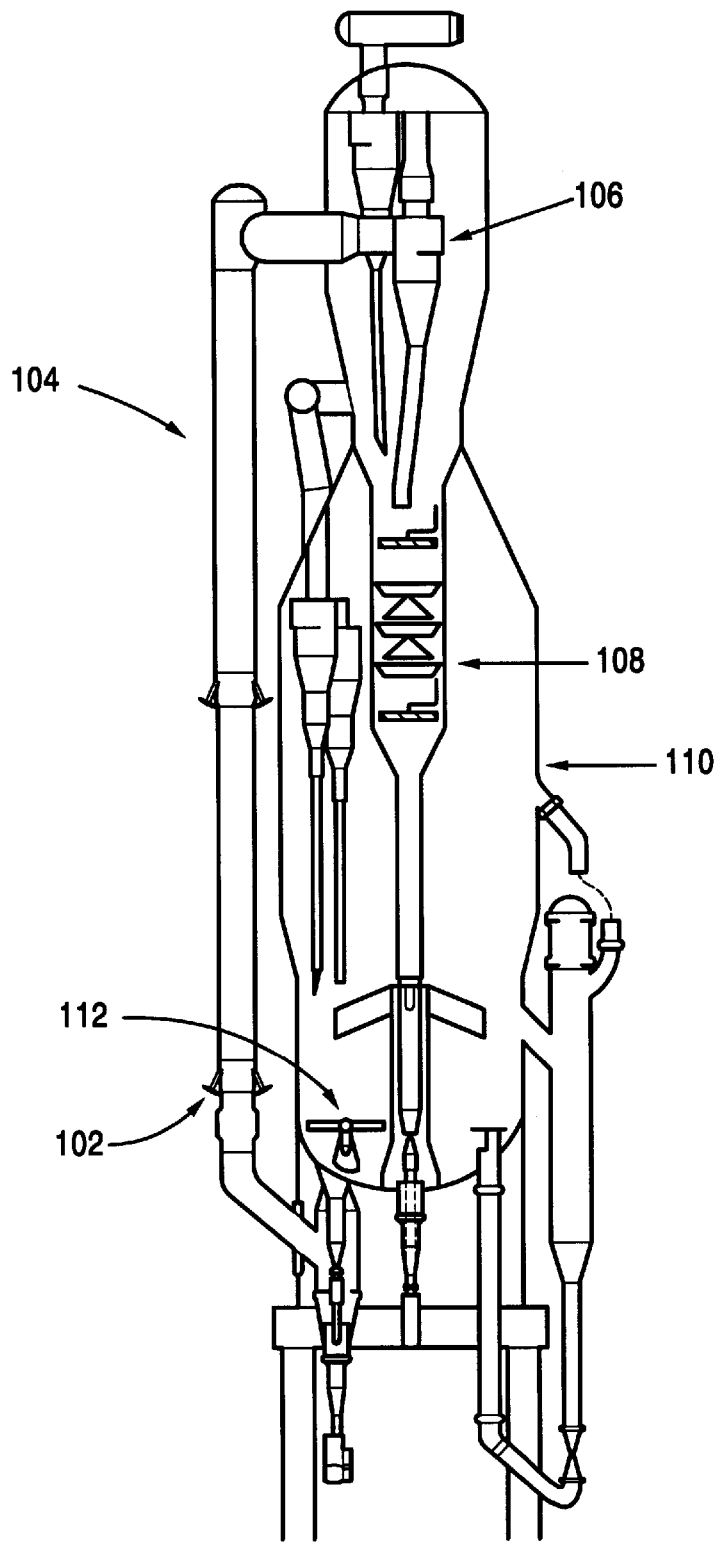
FIG. 8 depicts a conventional fluid catalytic cracking unit design in which the riser reactor is not contained within the annulus of the stripping section.

The present invention has been described thus far with respect to an annular FCC unit design. The use of the rotation vanes 50 can also be made with respect to an FCC unit design where the riser reactor is external to the stripping section. Such an FCC unit design is shown in FIG. 8 where the gas oil feed is introduced into the unit at the feed nozzles as shown by line 102 and the gas oil contacts the FCC catalyst particles within the riser reactor 104. The cracked products and the catalyst particles are then separated in the disengager section 106 with the catalyst particles falling through the stripper section 108. The stripped catalyst particles are then oxidized within the regenerator 110 while being fluidized with air through an air distributor 112.

Figure 9:
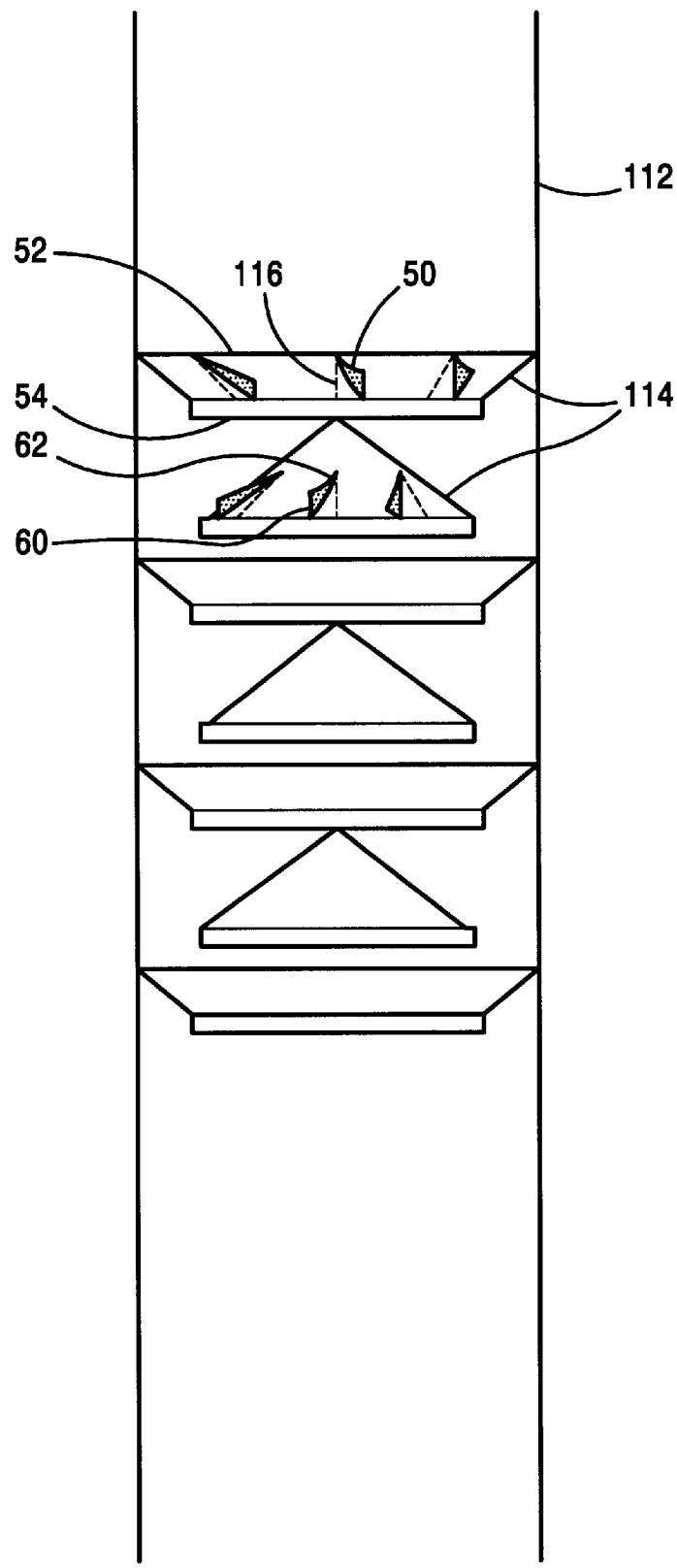
FIG. 9 is a view of the stripper section of the FCC unit shown in FIG. 8 wherein the stripper tray design is a "hat and tray" design shown with the rotational vanes of the present invention.

The FCC unit as shown in FIG. 8 has a "hat and tray" stripper tray design shown in FIG. 9. This stripper tray design is analogous to that shown for an annular FCC unit design although in this case the frustro-conical "hat" trays do not terminate into the riser reactor sidewalls. As shown in FIG. 9, the rotation vanes 50 are disposed on the trays 114. The trays have a top 52 and a bottom 54. The vanes 50 are shown to be displaced, from their rear edge 62 to their front edge 60, in an angular direction as shown by reference line 116, which is a line extending radially outward from the center of the stripper section. The stripper section is housed by stripper sidewalls 112.

Figure 10:
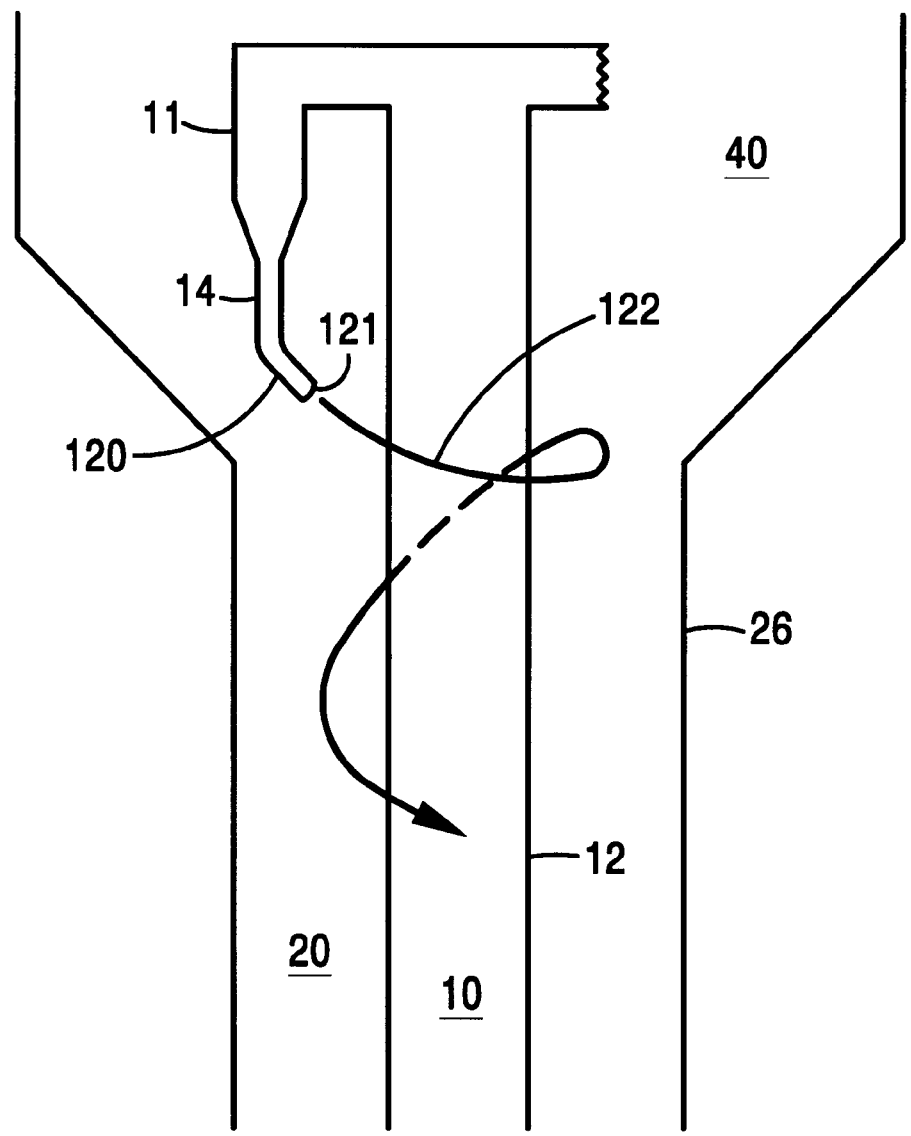
FIG. 10 depicts a curved dipleg for imparting rotational movement to the catalyst as it is discharged into the stripping section.

The rotational movement imparted to the cracking catalyst by the rotation vane designs set forth in this description can be enhanced by modifications to the diplegs exiting the disengager section of the FCC unit. As shown in FIG. 10, the riser reactor 10, defined by reactor walls 12, extends up through the stripper section 20, defined by stripper walls 26. The cracking catalyst exits the riser reactor 10 and flows through separator means 11, typically cyclones. The separator means directs the cracking catalyst down through a dipleg 14, which in turn directs the catalyst into the upper portion of stripper section 40. The dipleg outlet 121 is typically oriented to direct the catalyst particles straight down into the stripper section 20. In the present invention, the end 120 of the dipleg can be oriented in such a fashion that the cracking catalyst exiting the end 121 of the dipleg is rotated in the direction 122 of the desired catalyst flow through the stripper section 20 in accordance with the orientation of the rotation vanes 50 (not shown).

Various modifications can be made to the rotation vane designs described herein. For instance, the rotation vane designs shown in the figures extend from a point proximate to the top of the tray to a point proximate to the lip of the tray. However, the rotation vanes could form two rows on the surface of the tray such that the first row would extend from a point proximate to the top of the tray to a point near the mid-section of the tray with the second row beginning near the mid-section of the tray and extending to a point proximate to the lip of the tray. In other embodiments just one of the just described rows could be used, or an alternating pattern of vanes in the top row and bottom row could be used. Such variations are within the scope of the present invention.

Figure 11:
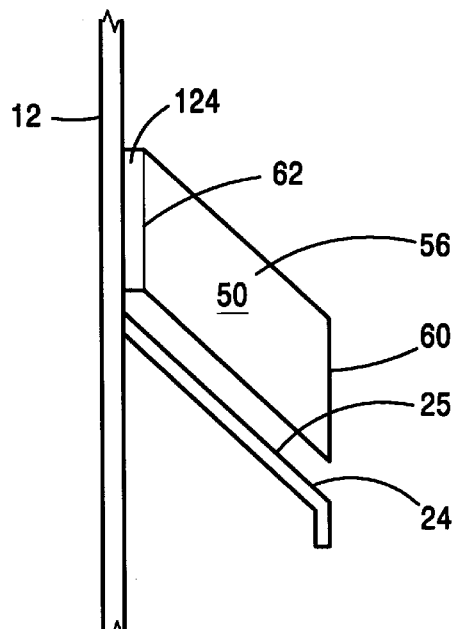
FIG. 11 depicts a vane attached to the wall of the stripper section for imparting rotational movement to the catalyst stream.

A further alteration of the present invention as set forth herein is shown in FIG. 11. FIG. 11 shows an embodiment of the present invention in which the rotation vane 50 is not disposed on the surface 25 of the stripper tray 24. Although it is preferred that the rotation vane 50 be positioned such that it is disposed on the surface 25 of the tray 24, it need not be for the purposes of the present invention. As shown in FIG. 11, the rotation vane 50 can be attached to a stub 124 that is attached to the reactor wall 12 (or to the stripper wall). The attachments can be by such means as welding, bolts, etc. Again, as described above, the vane 50 can be generally described as having a front edge 60 that is angularly displaced forward in the direction of the rotational catalyst flow from the rear edge 62. The vane 50 can be made such that it has a surface 56 as described above to impart rotational flow to the catalyst stream.

Figure 12:
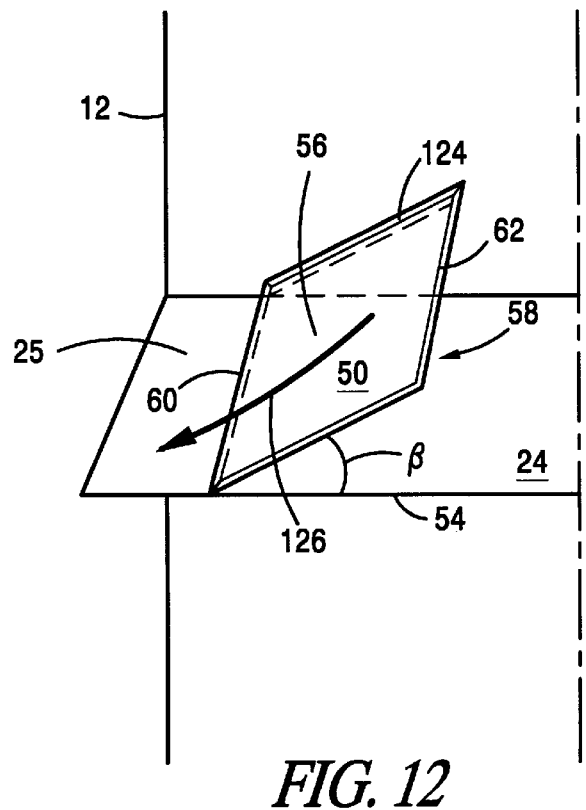
FIG. 12 depicts a different vane embodiment that can be attached to either the stripper tray or to the stripper wall, or both, for imparting rotational movement to the catalyst stream.

In another embodiment of the present invention, the vanes 50 can be designed in a similar fashion to the trays 24, but in a different orientation within the stripper section. For instance, as shown in FIG. 12, the vanes 50 can be positioned such that they are at an angle β from the edge 54 of the tray 24. In such a way the catalyst coming into contact with the vane 50 at its rear edge 62 is forced in a rotational direction illustrated by line 126 towards the front edge 60 of the vane 50. The vane 50 preferably is, but need not be, disposed on the surface 25 of the tray 24. The vane 50 can be affixed within the stripper section by conventional means, such as by being welded or bolted to stub 124, which is itself welded or bolted to the reactor wall 12 (inner stripper wall).

Also, the present invention can be used in conjunction with other improvements to the design of the stripping section, such as the tray design set forth in U.S. Pat. No. 5,531,884, which is hereby incorporated by reference in its entirety.

What is claimed is:

1. In a fluid catalytic cracking process for converting a hydrocarbon feedstock that comprises (1) contacting the feedstock with cracking catalyst particles that are capable of promoting the conversion of the feedstock in a reactor section to produce at least one hydrocarbon product with a concomitant production of coke on the cracking catalyst, (2) separating at least a portion of the hydrocarbon product from the catalyst particles in a disengager section, (3) stripping the catalyst particles with steam in a stripper section, and (4) regenerating the catalyst particles in a regeneration section to oxidize at least a portion of the coke, wherein steps (1) through (4) are repeated continuously, the improvement comprising:

(a) passing the catalyst over a plurality of vertically spaced trays located within the stripper section comprising:

an upper portion for receiving the catalyst;

a downstream portion, located at a point vertically below the upper portion, said downstream portion terminating in a tray edge for discharging the catalyst to a vertically lower tray;

a slanted tray surface, encompassing both the upper and downstream tray portions, having a tray surface angle of from about 10–80° to impart radial movement to the catalyst as the catalyst flows downward over the tray surface in a vertical fashion; and (b) passing the catalyst past a plurality of rotation vanes located within the stripper section to impart rotational movement to the catalyst, said rotation vanes having a front surface beginning at a rear edge and a front edge, wherein the front surface of said rotation vanes is angled such that the front edge is at a point angularly displaced in the rotational direction of the flow of the catalyst from the rear edge.

2. The process of claim 1 wherein the front edge of at least one rotation vane is at a point radially displaced in the direction of the radial flow of the catalyst from the rear edge.

3. The process of claim 1 wherein said trays comprise steam distribution holes extending through said tray at an angle in the direction of the rotational flow imparted to the catalyst from the rotation vanes.

4. The process of claim 1 wherein at least one of said rotation vanes is disposed on the surface of the tray.

5. The process of claim 4 wherein the rear edge of at least one rotation vane is located in the upper portion of the tray and the front edge of said rotation vane is located in the downstream portion of the tray.

6. The fluid catalytic cracking process of claim 1, further comprising directing the cracking catalyst into said upper portion of said stripper section through diplegs having exit ends within said upper portion and oriented so as to impart the same rotational direction of flow of the catalyst as said rotation vanes.

* * * * *